Oct. 7, 1930.  P. L. HAUGER  1,777,614
WASHER
Filed Sept. 9, 1927
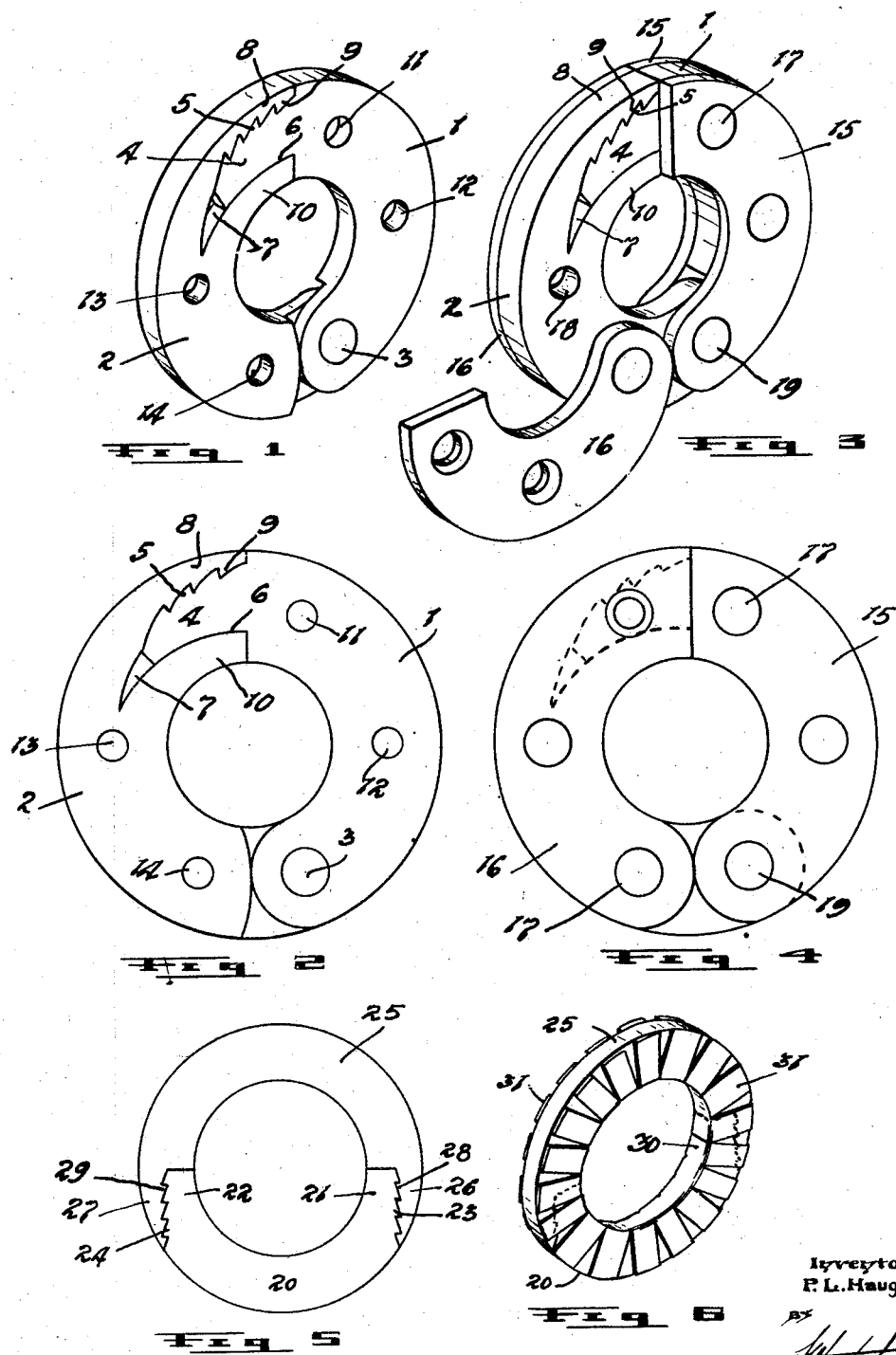

Patented Oct. 7, 1930

1,777,614

UNITED STATES PATENT OFFICE

PETER L. HAUGER, OF DAWSON CREEK, BRITISH COLUMBIA, CANADA

WASHER

Application filed September 9, 1927, Serial No. 218,565, and in Canada September 20, 1926.

The invention relates to improvements in washers and an object of the invention is to provide a washer which can be opened to permit it to be placed on a shaft, bolt or such like from the side and subsequently locked thereon, this allowing one to readily take up any loose play without having to dismount any of the existing parts.

A further object is to construct the washer so that it can be adjusted to fit the shaft or the like and such that it can be manufactured in a simple, durable and inexpensive manner.

A further object is to construct the washer so that the engaged jaws thereof can be positively held against lateral shifting and further such that the thickness of the washer can be readily varied to accommodate the space which it is required to fill by utilizing the washer.

With the above more important objects in view, the invention consists essentially in the arrangement and construction of parts hereinafter more particularly described, reference being had to the accompanying drawing, in which:—

Fig. 1 is a perspective view of the hinged washer sections, the filler plates being removed.

Fig. 2 is a side view of the washer as it appears in Figure 1.

Fig. 3 is a perspective view of the washer with the filler placed thereon and one of the plates being swung down to expose construction.

Fig. 4 is a side view of the washer as it appears in Figure 3.

Fig. 5 is a face view of a modified form of the washer.

Fig. 6 is a perspective view of the type of washer shown in Figure 5 and showing the modified arrangement of filler plate.

In the drawing like characters of reference indicate corresponding parts in the several figures.

The main part of the washer according to Figures 1 to 4 inclusive, comprises two halves or sections 1 and 2, the section 1 being what might be termed a male section and 2 a female section. The sections are of an arcuate shape and in Figure 1 are hingedly connected together by a rivet or pin 3, it being here observed that the attached ends of the sections are reduced in thickness so that the total thickness of the washer at this point is the same as the full thickness of either of the sections.

The male member of the section 1 is provided with an extending jaw 4 having the outer edge thereof formed with a series of ratchet teeth 5 which are arranged more or less concentric to the center point of the washer. The body of the washer is notched away underlying the jaw as indicated at 6. The female member of the washer sections 2 has the free end thereof provided with a lengthwise extending slot 7 which is adapted to receive the jaw 4 and which provides an outer spring jaw 8 having a series of ratchet teeth 9 on the inner side thereof adapted to engage with teeth 5.

When the jaws are pressed together, the teeth of the jaw 8 are adapted to spring past the teeth of the jaw 5, the arrangement of the teeth being such that when engaged they resist the pulling apart of the jaws. The finger formed at 10 on the female section acts with the remaining part of the washer to center the washer on the shaft, rod or the like on which it is placed. The washer can be opened by forcibly expanding the jaw 8 to release the teeth or by springing the male jaw laterally to escape the teeth of the other jaw.

The washer as shown in Figure 1 is what might be termed a thin washer which can be used where a comparatively small amount of play is to be taken up. It will be observed that the sections of the said washer are provided with pairs of holes 11 and 12, 13 and 14, the purpose of which will be shortly explained.

Where there is considerable play to be taken up, a comparatively thick washer will be required and accordingly it is desirable to provide filler plates and a washer equipped with filler plates is shown in Figures 3 and 4. In this type, the sections of the washer are made in the same manner as shown in Figures 1 and 2 with the exception that the attached or hinged ends thereof are not formed in the same way. The pairs of filler plates 15 and 16 utilized are attached to the washer sections by rivets 17 passing through holes 18 formed in the washer sections, these holes corresponding to the holes 11 and 12, 13 and 14 provided in the sections of the washer appearing in Figure 1. It will be observed that the lower ends of the filler plates 15 extend beyond the lower end of the washer section 1 to provide side lugs and that the lower end of the section 2 of the washer enters between these side lugs and is pivotally attached thereto by a rivet 19.

Obviously one could supply several pairs of filler plates to increase the thickness of the washer and at such time, would utilize longer rivets to hold the parts together. The filler plates shown in Figure 3 can be used on the washer shown in Figure 1 by passing the rivets through the holes 11, 12, 13 and 14. It will be particularly observed that when the filler plates have been closed together as shown in Figure 4 and held by the rivets, they prevent any possibility of lateral shifting of the jaw 4 which at such time is engaged with the jaw 8.

In Figure 5 I have shown a further modification of the washer and wherein the male and female sections are not hingedly connected together but are entirely separate. The male member 20 in this instance instead of being supplied with one jaw has the ends thereof terminating in two jaws 21 and 22 which are provided on the outer side with ratchet teeth 23 and 24 and the female member 25 has the ends terminating in spring jaws 26 and 27 fitted at their inner edges with ratchet teeth 28 and 29 which are adapted to engage 23 and 24 when the washer sections are forced together. This form of washer is taken apart in the same manner as the former and is held on the shaft by forcibly pressing the teeth of the jaws into engagement.

In Figure 6, I have shown a modified type of filler plate utilized with the type of washer shown in Figure 5. The filler plate 30 is originally in the form of a cylinder having the ends thereof longitudinally slit to provide a plurality of tongues 31. When the filler is in use, the tongues thereof are bent outwardly against the face of the washer sections in the manner shown in Figure 6.

By providing my washer and filler plates, it is very easy to take up loose play where such occurs. If there is not much loose play, the washer without the filler plates is used. Where there is considerable loose play, one selects filler plates which will accommodate the amount of play and attaches them to the washer sections by the rivets and then passes the washer onto the shaft and locks it.

What I claim as my invention is:—

1. A washer comprising arcuate male and female members hingedly connected together, the male member having the free end thereof terminating in a jaw provided at its outer edge with a series of ratchet teeth and the female member having its free end terminating in a spring jaw provided on the inner edge with a series of ratchet teeth complementary to and engageable with the former ratchet teeth and within the latter spring jaw with a guide finger underlying the jaw of the male member and adapted to close the open centre of the washer in all adjusted positions of the jaws.

2. A washer comprising arcuate male and female sections hingedly connected together, the male section having the free end thereof terminating in a jaw provided at its outer edge with a series of ratchet teeth and the female section having its free end terminating in a spring jaw provided on the inner edge with a series of ratchet teeth complementary to and engageable with the former ratchet teeth and within the latter jaw with an arcuate guide finger underlying the jaw of the male member and adapted to close the open centre of the washer in all adjusted positions of the jaws and arcuate filler plates attached to the outer sides of the sections and preventing lateral displacement of the jaws.

Signed at Pouce Coup this 23rd day of August, 1927.

PETER L. HAUGER.